UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER.

No. 919,143.  Specification of Letters Patent.  Patented April 20, 1909.

Application filed October 15, 1907. Serial No. 397,466.

*To all whom it may concern:*

Be it known that I, CARLETON ELLIS, a citizen of the United States, and resident of Larchmont, in the county of Westchester and State of New York, have made certain new and useful Inventions Relating to Finish-Removers, of which the following is a specification.

This invention relates to finish removers, and relates especially to removers, comprising alcoholic or similar compounds of phenolic acid material, that is, compounds of carbolic, cresylic or analogous acids.

Many phenates or compounds of phenolic acid material, that is to say, carbolic, cresylic or other acid material with alcohols, such as methyl, ethyl or denatured alcohol, are desirable non-inflammable finish solvents for use in removers. These phenolic acid derivatives may be prepared by distilling raw sodium phenate with the sulfate of methyl, ethyl or denatured alcohol after its neutralization with sodium or calcium, for instance. The raw sodium phenate or carbolate of commerce from which pure carbolic acid is prepared may be distilled in a suitable apparatus with the sodium alcoholic sulfate, the alcoholic phenates being given off at temperatures up to 170° C. or so. In this case, the denatured alcohol containing ethyl and methyl alcohols as well as some other material, the phenate of denatured ethyl alcohol of course contains ethyl and methyl carbolates, cresylates and other material. Of course, the pure ethyl carbolate may be prepared by similarly distilling pure sodium carbolate with the alcoholate formed by treating pure methyl alcohol with concentrated sulfuric acid and then neutralizing it with soda. Suitable phenates may also be formed by esterification of alcoholic bodies, such, for example as by the esterification of ethyl, methyl or amyl alcohol with carbolic acid or other phenolic acid material in a suitable digester. Mixed phenates are preferably produced in this way combined with the additional acid material to the desired extent, these esters having a very desirable ameliorating effect on the acid bodies and being in themselves desirable solvent ingredients for removers in many cases. Methyl carbolate, for instance, is a mobile liquid of pleasant aromatic odor having a boiling point of about 152° C. and considerable solvent action. This solvent is a neutral volatile body free from the undesirable corrosive action of ordinary carbolic acid. Phenolic solvent material of this character may be used in removers in connection with other loosening finish solvent material, that is, solvents having a generally alcoholic character or action in removers, such, for example, as methyl, ethyl, amyl, allyl and denatured alcohols, acetone, methyl acetone referred to in the Ellis patent 811,044, methyl ethyl ketone, acetone oil, light oil of hard wood tar, resin spirits, butyrone and allied solvents. Penetrating finish solvent material may also be employed, that is, solvents having a generally benzolic character or action in removers including benzol, toluol, xylol, cumene, benzin and other petroleum hydrocarbons, carbon-tetrachlorid, chlorid of acetylene, chlorbenzol, chlortoluol, and other chlorinated solvents. If desired, also, antacid or palliative material may be used in this connection, such as anilin, methylamin, oxid of magnesium, sodium or potassium hydrate or soapy material.

Although not necessary in all cases, suitable stiffening material may be employed, such as flour, starch, wood flour, whiting, fuller's earth, magnesia, infusorial earth, and also waxy, soapy or gelatinous stiffening material, including paraffin or ceresin, sodium, potassium or ammonium stearate, palmitate, resinate, and so forth, nitro-cellulose, such as the slightly soluble variety, for example, containing 13% of nitrogen, also proteid material, such as casein, dissolved in suitable mediums such for instance as concentrated formic acid, it being, of course, understood that all the ingredients are preferably thoroughly incorporated by agitation at the desired slight rise of temperature.

An illustrative remover of this character may comprise phenate of denatured ethyl alcohol 30 parts, methyl phenate 50 parts, benzol 40 parts, and paraffin 3 parts. Another illustrative remover may comprise phenate of denatured ethyl alcohol 10 parts, light oil of wood tar 5 parts, resin spirits 5 parts, light magnesium oxid 3 parts, and wood flour 4 parts. Another illustrative remover may comprise methyl phenate 5 parts, acetone 10 parts, suitably combined with 1 to 2 parts of a saturated solution of casein in concentrated formic acid which can, of course, be prepared by heating in a reflux condenser apparatus. Another illustrative remover may comprise methyl cresylate 10 parts, acetone 10 parts, benzol 10 parts and ceresin wax 1 part. Another illustrative remover may comprise phenate of denatured ethyl alcohol 30 parts, phenate of methyl alcohol 50 parts, benzol 40 parts, paraffin 3 parts, and starch 8 parts. Another illustrative remover may comprise carbolate of denatured ethyl alcohol 20 parts, carbolate of methyl alcohol 20 parts, carbon-bisulfid 60 parts and dry sodium stearate or other dry soapy material 6 parts. Another illustrative remover may comprise phenate of denatured ethyl alcohol 20 parts, acetone 10 parts, benzol 5 parts, benzin 5 parts combined with 2 parts of a slightly soluble nitro-cellulose containing about 13% of nitrogen. Another illustrative remover may comprise methyl carbolate 98 parts and paraffin 2 parts. Another illustrative remover suitable for tank work may comprise phenate of denatured ethyl alcohol 1 part, phenate of methyl alcohol 2 parts and benzol 1 part.

This case comprises divisional subject matter taken from the copending Ellis application No. 364,749, filed March 27th, 1907. This invention has been described in this case in connection with a number of illustrative ingredients, processes, relative proportions and formulas, to the details of which disclosure the invention is not, of course, to be limited.

What is claimed is.

1. The finish remover comprising approximately 30 parts of phenate of denatured ethyl alcohol, 50 parts of phenate of methyl alcohol, 40 parts of benzol, 3 parts of paraffin and 8 parts of starch.

2. The finish remover comprising approximately 30 parts of phenate of denatured alcohol, 50 parts of methyl phenate, 40 parts of penetrating finish solvent material and stiffening material including wax.

3. The finish remover comprising approximately 30 parts of phenate of denatured ethyl alcohol, 50 parts of methyl phenate, penetrating finish solvent material and evaporation retarding stiffening material.

4. The finish remover comprising phenate of denatured ethyl alcohol, penetrating finish solvent material and stiffening material.

5. The finish remover comprising phenate of denatured alcohol and stiffening material.

6. The finish remover comprising phenate of denatured ethyl alcohol and penetrating finish solvent material.

7. The finish remover comprising phenate of denatured ethyl alcohol and other finish solvent material.

8. The finish remover comprising methyl phenate, penetrating finish solvent material and stiffening material.

9. The substantially fluent finish remover comprising alkyl phenate material and incorporated composite finish softening material.

10. The finish remover comprising methyl phenate and aromatic penetrating finish solvent material.

11. The finish remover comprising methyl phenate, aromatic penetrating finish solvent material and stiffening material.

12. The finish remover comprising alkyl phenate material and penetrating finish solvent material.

13. The finish remover comprising approximately 80 parts of alkyl phenate material, 40 parts of penetrating finish solvent material and stiffening material.

14. The finish remover comprising approximately 80 parts of alkyl phenate material and 40 parts of miscible penetrating finish solvent material.

15. The finish remover comprising alkyl phenate material, penetrating finish solvent material and stiffening material.

16. The finish remover comprising alkyl phenate material and stiffening material.

17. The finish remover comprising methyl phenate and incorporated composite penetrating finish solvent material.

18. The finish remover comprising a finish solvent phenolic esterification compound of loosening finish solvent material and incorporated stiffening material.

19. The substantially fluent finish remover comprising a finish solvent phenolic derivative of loosening finish solvent material and stiffening material.

20. The finish remover comprising a finish solvent phenolic esterification derivative of loosening finish solvent material and penetrating solvent material incorporated therewith.

CARLETON ELLIS.

Witnesses:
HARRY L. DUNCAN,
JESSIE B. KAY.